(12) United States Patent
Alava et al.

(10) Patent No.: US 10,973,102 B2
(45) Date of Patent: Apr. 6, 2021

(54) METHOD AND ARRANGEMENT FOR CONTROLLING LIGHTING IN A VEHICLE

(71) Applicant: Teknoware Oy, Lahti (FI)

(72) Inventors: Matti Alava, Lahti (FI); Harri Mattila, Lahti (FI)

(73) Assignee: Teknoware Oy, Lahti (FI)

( * ) Notice: Subject to any disclaimer, the term of this patent is extended or adjusted under 35 U.S.C. 154(b) by 0 days.

(21) Appl. No.: 16/928,443

(22) Filed: Jul. 14, 2020

(65) Prior Publication Data

US 2021/0037628 A1 Feb. 4, 2021

(30) Foreign Application Priority Data

Aug. 2, 2019 (FI) ...................... 20195658

(51) Int. Cl.
*H05B 45/382* (2020.01)
*B60Q 3/47* (2017.01)
(Continued)

(52) U.S. Cl.
CPC ............. *H05B 45/382* (2020.01); *B60Q 3/47* (2017.02); *B60Q 3/80* (2017.02); *H05B 45/37* (2020.01);
(Continued)

(58) Field of Classification Search
None
See application file for complete search history.

(56) References Cited

U.S. PATENT DOCUMENTS

2010/0207539 A1 8/2010 Haeusser
2012/0313537 A1 12/2012 Gruber et al.
(Continued)

FOREIGN PATENT DOCUMENTS

EP 3 241 407 A1 11/2017
FI 20175926 A1 4/2019
(Continued)

OTHER PUBLICATIONS

Extended European Search Report for corresponding European Patent Application No. 20161236.3 dated Aug. 19, 2020, 8 pages.
(Continued)

*Primary Examiner* — Dedei K Hammond
(74) *Attorney, Agent, or Firm* — Merchant & Gould P.C.

(57) ABSTRACT

The control device for the luminaire of a vehicle has an operating power input (401) for receiving operating power, an illumination output (402) for supplying illumination power to one or more light sources (403), and a power converter (404) coupled between said operating power input (401) and said illumination output (402) for converting received operating power into illumination power, which is directed outside. The power converter (404) has a control connection (405). The control device has a control data connection (406) for transmitting control data, and a controller circuit (407) coupled between said control data connection (406) and said control connection (405). The control device has a control power input (408) separate from said operating power input (401) for receiving control power to said controller circuit (407) independently of said operating power, as well as a galvanic isolation (409) between said control circuit (407) and said power converter (407). The coupling from the controller circuit (407) to said control connection (405) passes through said galvanic isolation (409).

15 Claims, 4 Drawing Sheets

(51) Int. Cl.
    *H05B 47/18*     (2020.01)
    *H05B 45/37*     (2020.01)
    *H05B 47/105*     (2020.01)
    *H05B 47/19*     (2020.01)
    *B60Q 3/80*     (2017.01)
    *F21Y 115/10*     (2016.01)

(52) U.S. Cl.
    CPC ........... *H05B 47/105* (2020.01); *H05B 47/18* (2020.01); *H05B 47/19* (2020.01); *F21Y 2115/10* (2016.08)

(56) References Cited

U.S. PATENT DOCUMENTS

| | | | |
|---|---|---|---|
| 2013/0300310 A1* | 11/2013 | Hu .................. | H05B 45/10 315/239 |
| 2014/0354170 A1 | 12/2014 | Gredler et al. | |
| 2020/0068680 A1* | 2/2020 | Neudorf ................. | H05B 45/20 |

FOREIGN PATENT DOCUMENTS

| WO | WO 2009/118123 A2 | 10/2009 |
|---|---|---|
| WO | WO 2015/148562 A1 | 10/2015 |

OTHER PUBLICATIONS

Finnish Search Report for corresponding Finnish Patent Application No. 20195658 dated Nov. 28, 2019, 2 pages.

\* cited by examiner

METHOD AND ARRANGEMENT FOR CONTROLLING LIGHTING IN A VEHICLE

This application claims benefit of Serial No. 20195658, filed 2 Aug. 2019 in Finland and which application is incorporated herein by reference. To the extent appropriate, a claim of priority is made to the above disclosed application.

FIELD OF THE INVENTION

The invention relates generally to the provision of lighting in a vehicle such as bus, train carriage, tram, aircraft, ship or the like. In particular, the invention relates to the way in which control of lighting is implemented in a vehicle.

BACKGROUND OF THE INVENTION

Lighting systems of vehicles differ in many ways from lighting systems used in buildings. Internal electrification of vehicles does not necessarily rely on alternating current network of 230 volts (or 120 volts, or any other standardized mains voltage) as in buildings; instead the most commonly available voltage may be, for example, DC voltage of 12, 24 or 48 volts originating from the battery pack of the vehicle. The electrical system of a vehicle may have several voltage levels available and their availability may vary depending on the situation, for example, whether the vehicle is temporarily connected to an external network. Exposure to motion, vibration and temperature fluctuations places great demands on all electronic components of vehicles. In addition, the components of the vehicle lighting system should be easy to maintain, replace and modify for different purposes.

Figure 1:
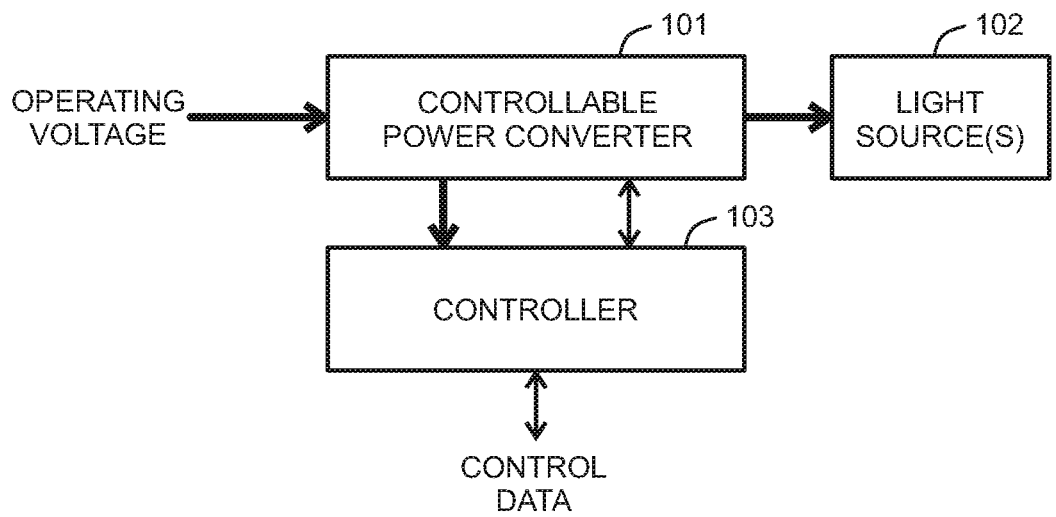

It is nowadays commonplace in both vehicles and buildings that lighting can be controlled in a centralized way. Several basic solutions are known for providing controllable lighting. FIG. 1 is a block diagram of a simple controllable luminaire. The controllable power converter 101 may include, for example, a rectifier (if the operating voltage is AC), filters, and one or more switched-mode power supplies. The light source 102 may be, for example, a LED module in which a plurality of LED chips is mounted on a circuit board and connected as an electric circuit. The controller 103 may be a microprocessor or a microcontroller with possible auxiliary circuits, and it may obtain control data through a separate control bus. The operating voltage of the controller 103 usually originates from the power converter section 101.

Figure 2:
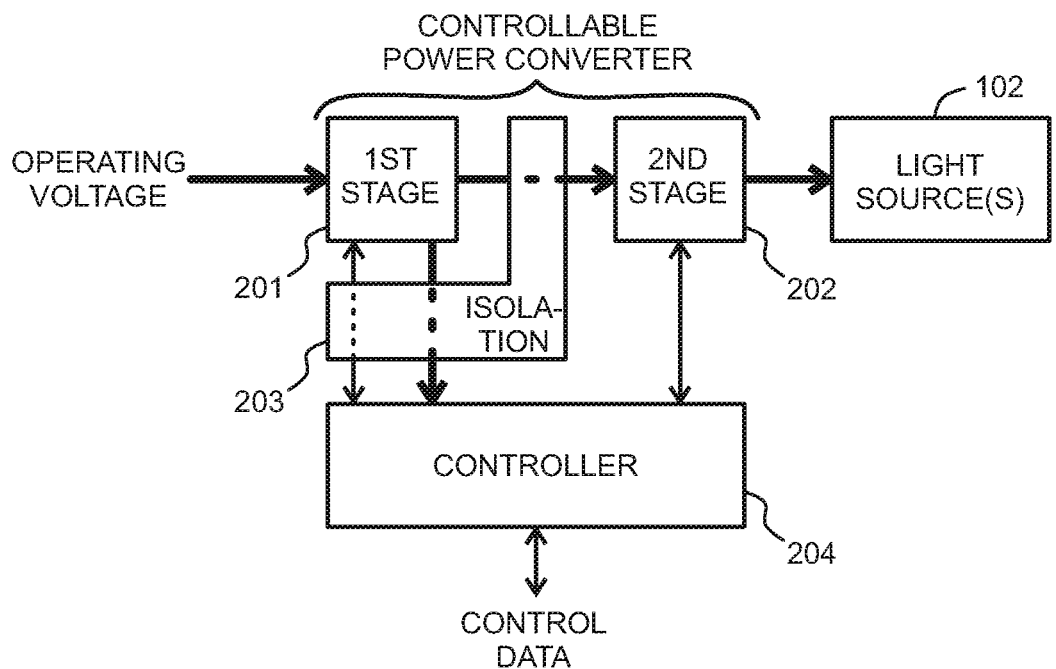

FIG. 2 shows a slightly more complex controllable luminaire, in which the controllable power converter comprises a primary section, i.e. first stage 201, and a galvanically isolated secondary section, i.e. second stage 202. Galvanic isolation 203 may be required, for example, in order to improve electrical safety. The controller 204 operates at low voltage, so that it is often most natural to connect it directly to the second stage 202, and to connect it to the first stage 201 over the galvanic isolation 203. The operating voltage to the controller 204 originates also in this case from the power converter section, for example from the first stage 201, over the galvanic isolation 203.

Figure 3:
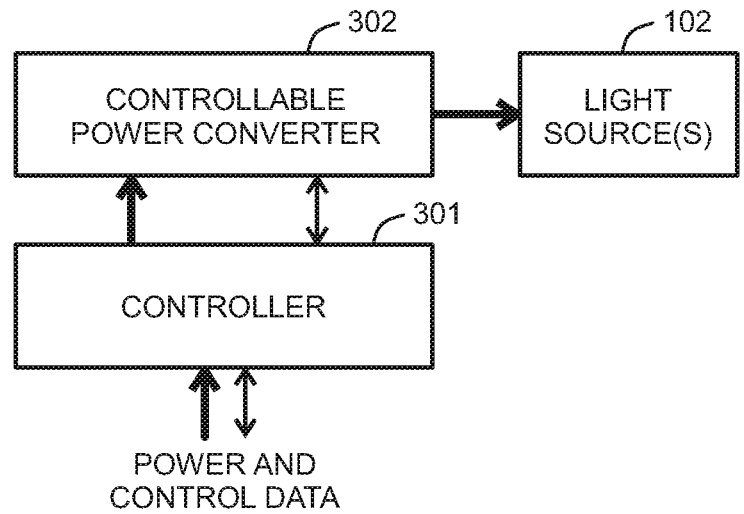

FIG. 3 shows another known controllable luminaire in which all the required power arrives along the same path as the control data. This may for example be a PoE-type solution (Power over Ethernet), where a control bus originally developed for data transmission purposes is also used for transmitting operating power. The controller 301 and the controllable power converter 302 must, of course, be designed so that they are suitable for supplying power through a control bus. Somewhat similar solutions, as regards their principle, are phase angle controlled AC voltage luminaires, which receive control data in form of partially cut half-waves of the AC voltage.

In lighting systems of modern vehicles several requirements are imposed simultaneously on luminaires, some of which may conflict mutually. One requirement which is often emphasized is proactive maintenance, which means that both the luminaires and other devices should be connected to some kind of internal diagnostic system. It collects, stores, and reports data on performance of equipment, which data can then be used to predict the maintenance need of the equipment before it actually fails. However, an electronic device is able to participate in the diagnosis only when it has sufficient operating power available. On the other hand, it is typical for vehicles to wait for long periods, for example, at a railway yard or depot, so that the power system providing power to the devices is disconnected. In addition, all electrically functioning parts of the vehicle should be as energy efficient, safe and secure as possible.

SUMMARY OF THE INVENTION

The object of the invention is to provide a method and an arrangement for implementing lighting of a vehicle so that the components of the lighting system may be controlled in versatile manner in all operating situations of the vehicle. Particularly, the object of the invention is to allow the internal diagnostics of the lighting system to be arranged efficiently and reliably. A further object of the invention is to integrate the lighting system into other electronic systems of the vehicle in a natural manner. It is a further object of the invention that the lighting system enables a smooth and efficient configuration even when the components must be maintained and/or replaced.

The objects of the invention are achieved by arranging in the vehicle separate power distribution buses for electric power used for lighting and for electric power used for controlling the lighting, and by constructing at least part of the luminaires so that their controller section is galvanically isolated from the power converter section.

The invention is characterized by what is set forth in the characterizing part of the appended independent claims. The dependent claims disclose some preferred embodiments of the invention.

The control device for a luminaire of a vehicle presented herein has:
  an operating power input for receiving operating power,
  an illumination output for directing illumination power to one or more light sources,
  a power converter coupled between said operating power input and said illumination output for converting received operating power into illumination power which is directed to the illumination output, the power converter having a control connection,
  a control data connection for conveying control data, and
  a controller circuit coupled between said control data connection and said control connection.

The control device is characterized in having:
  a control power input separate from said operating power input and coupled to said controller circuit for receiving control power to said controller circuit independently of said operating power, and a galvanic isolation between said controller circuit and said power converter, wherein the connection from the controller circuit to said control connection passes through said galvanic isolation.

According to one embodiment, said power converter is a controllable power converter, wherein the amount of said illumination power it generates is determined based on control signals it receives through said control connection, and said controller circuit is arranged to generate said control signals based on control data received through said control data connection. This provides the advantage that the amount and/or color of light can be controlled as desired at different locations in the vehicle by utilizing the control arrangement which in addition can be utilized for many other purposes, as described below.

According to one embodiment, said controller circuit is arranged to receive one or more diagnostic signals from said power converter through said control connection and to communicate diagnostic information resulting from the received diagnostic signals via said control data connection. This provides the advantage that it is possible to proactively monitor the condition of the vehicle luminaires, so that it is possible to make a quick intervention on defective or at-risk equipment, even before the failure has visible consequences.

According to one embodiment, said controller circuit is arranged internally to generate one or more diagnostic signals and to communicate diagnostic information resulting from the diagnostic signals it has generated, via said control data connection. This provides the advantage that the above described proactive condition monitoring and intervention to equipment at risk of failure can be extended to include operation on the side of the galvanic isolation which has the controller circuit.

According to one embodiment, the control power input is arranged to receive an extra low voltage as defined in electrical safety regulations. This provides advantage in structure and handling, as the voltage protection on the control power side does not need to be very significant.

According to one embodiment, the control device has a sensor coupled to said controller circuit, which sensor is arranged to measure at least one environmental factor at the location of the luminaire. This achieves synergy since it is possible to implement other functions in the same device than a just mere lighting control.

According to one embodiment, said sensor includes at least one of the following: a temperature sensor, a gas sensor, a humidity sensor, an air pressure sensor, an acceleration sensor, a motion sensor, an occupancy sensor. This advantageously achieves versatility in the operation of the device.

According to one embodiment, the control device has a sensor interface for connecting an external sensor to said controller circuit. This provides the advantage that the versatile operation described above can also be extended to the environment of the luminaire.

According to one embodiment, said control data connection is a bidirectional bus connection. This provides the advantage that the device connections are relatively simple and quick to install and maintain.

According to one embodiment, said controller circuit is arranged to perform a predetermined operation in relation to the processing of control data, only in response to a grant signal, which it has received through the control data connection, and said controller circuit is arranged to forward the grant signal through the control data output connected thereto after having performed said action. This provides the advantage that, especially after the initial installation, the configuration of the arrangement as operational is simple and fast and can be largely automated.

The vehicle's luminaire presented herein has the control device of the type described above, and connected to its illumination output, one or more light sources, which most preferably form a LED module.

The vehicle's lighting arrangement presented herein has a central lighting controller and an associated vehicle's lighting control bus for delivering control data to the luminaires. The lighting arrangement is characterized in having at least one control device of the type described above connected to said control bus via its control data connection, and one or more light sources connected to the illumination output of said control device(s).

According to one embodiment, the lighting arrangement has an operating power bus to be connected to a further power distribution system of the vehicle, and to which said one or more control devices are connected via their operating power inputs, and a control power bus extending from the central lighting controller to said one or more control devices, and to which said one or more control devices are connected via their control power inputs. This provides the advantage that the distribution of operation and control power may be kept separate over the entire vehicle.

According to one embodiment, the lighting arrangement has one or more sensors, each of which is coupled to said central lighting controller either directly or via one of said lighting control devices. This provides the advantage that the data transmission capability of the lighting arrangement may also be used for transmitting data generated by the sensors and for controlling the sensors.

According to one embodiment, at least one of said sensors is coupled to said central lighting controller for supplying only operating voltage to said sensor, wherein said sensor is further in wireless data communication with a measuring arrangement. This provides the advantage that the power supply of the sensor may be secured without limiting in any way where and when it delivers the measurement data it generates.

LIST OF FIGURES

Figure 4:
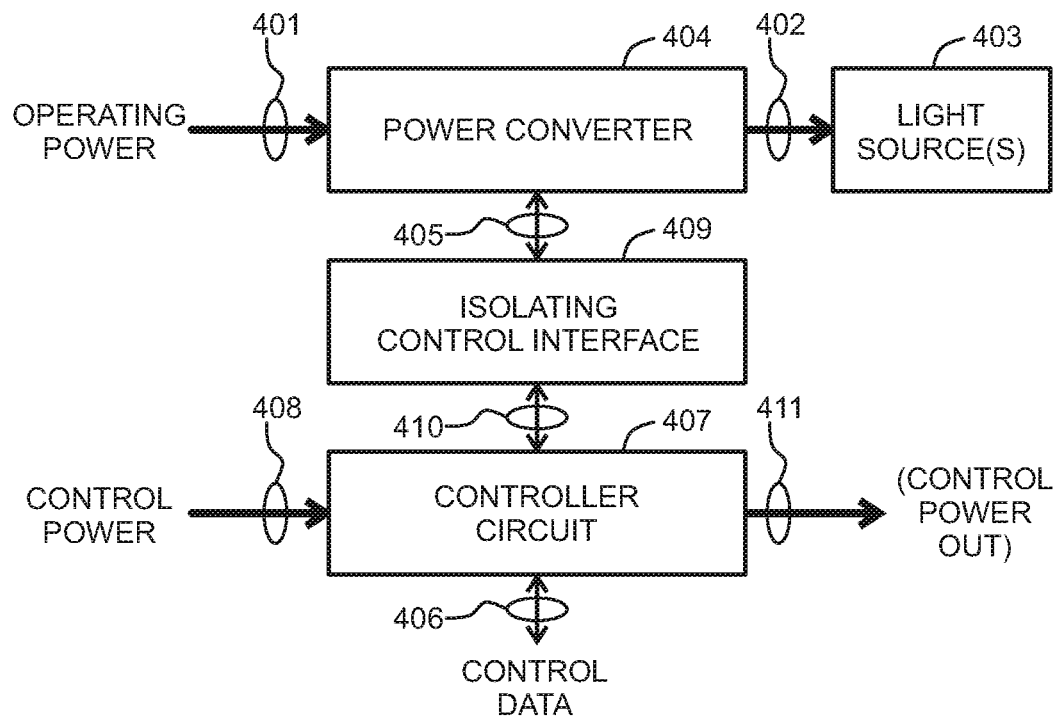
Figure 5:
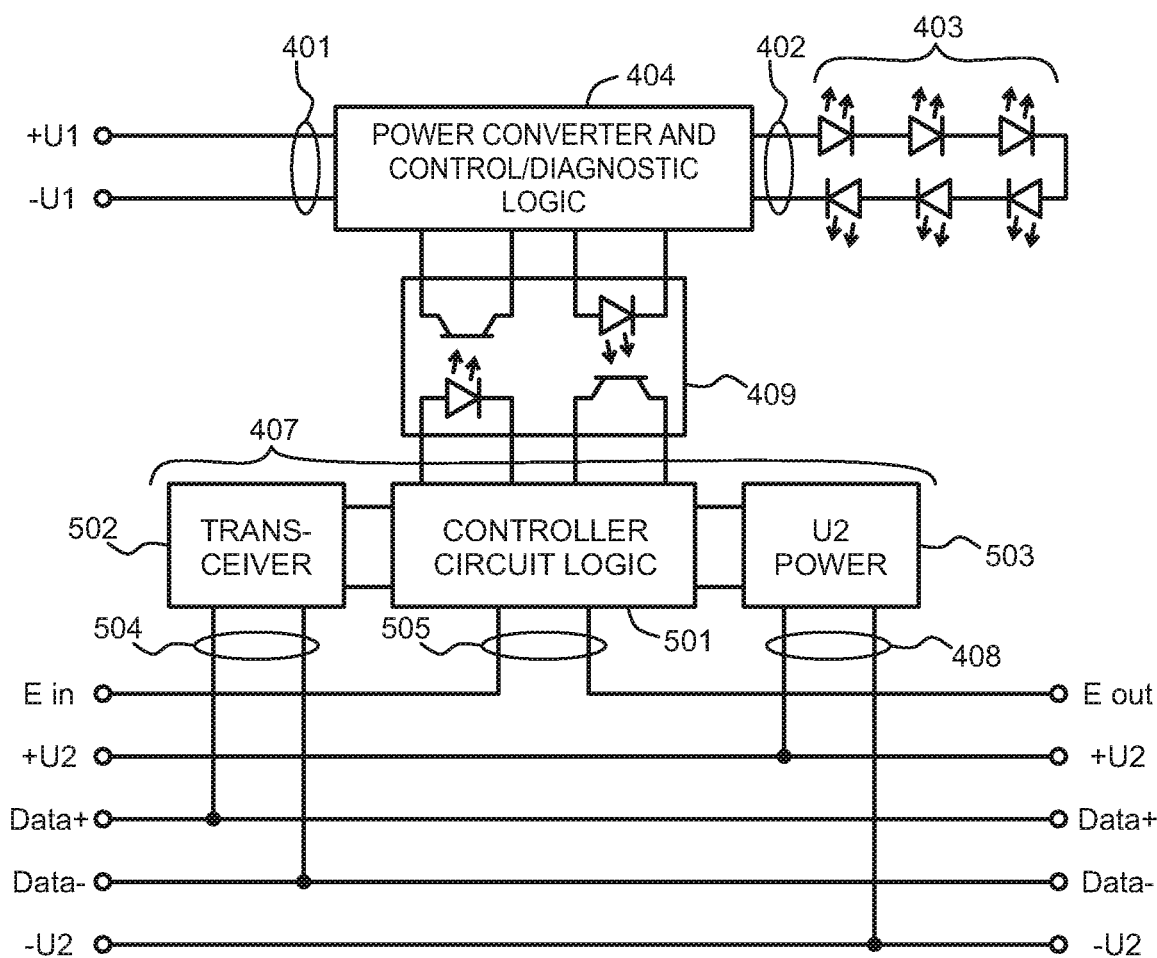
Figure 6:
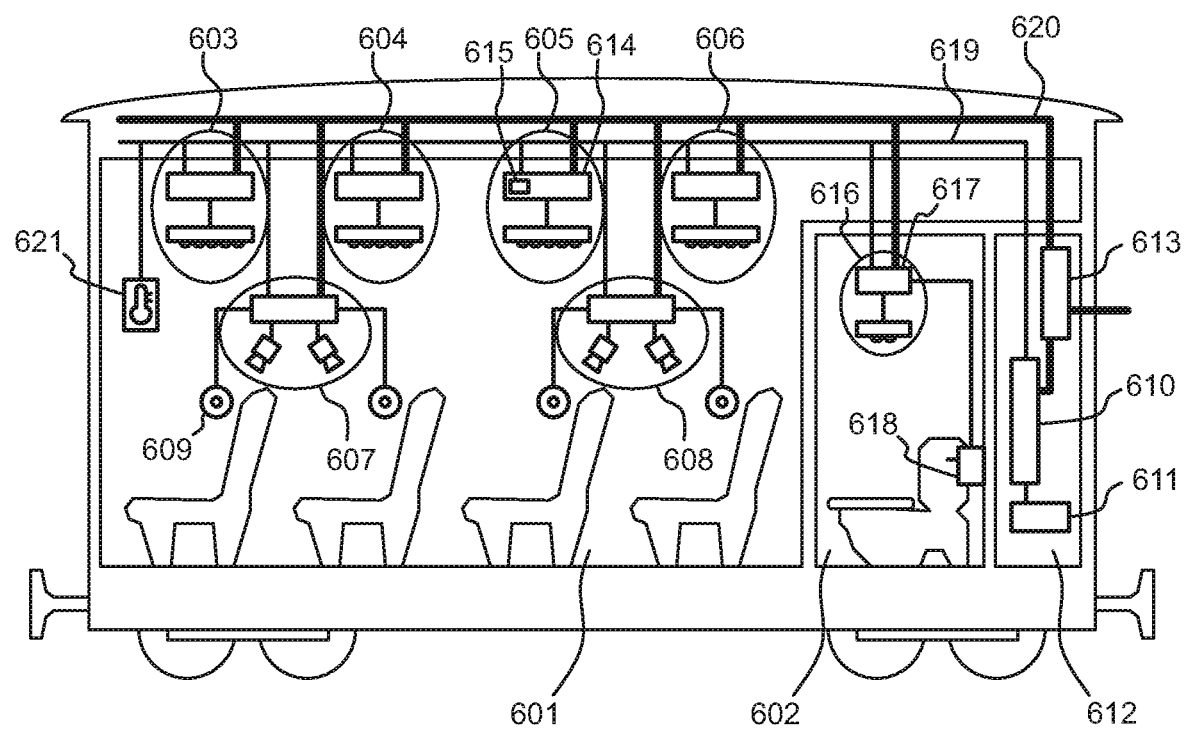

FIG. 1 shows a prior art luminaire,
FIG. 2 shows a prior art luminaire,
FIG. 3 shows a prior art luminaire,
FIG. 4 shows the principle of separate power supplies and galvanic isolation,
FIG. 5 shows an embodiment in which the power supplies of the power conversion section and the controller section are separated, and
FIG. 6 shows a lighting system of a vehicle.

In the Figures, same reference numerals are used for like parts.

DETAILED DESCRIPTION OF THE INVENTION

FIG. 4 is a block diagram illustrating a control device for a luminaire of a vehicle. It has an operating power input 401 for receiving operating power and an illumination output 402 for directing illumination power to one or more light sources 403. Light sources 403 may form for example a LED module in which one or more LED chips are connected to a circuit board that serves as support structure and thermal adjusting member for the LED chips and the electrical conductors they require. A power converter 404 is coupled between the operating power input 401 and the illumination output 402, which functions so as to convert the received operating power into illumination power which is directed outwards. The power converter 404 may include for example one or more stages which operate on the principle of a switched-mode power supply, which are used for providing the necessary conversions between voltage levels and for determining the amount of illumination power obtained from the illumination output 402. One power converter 404 may even have several illumination outputs 402, for example if the light sources 403 have different LEDs in terms of their color and/or color temperature, wherein the color and/or color temperature of the light emitted by the luminaire may be influenced by regulating the relative amount of power directed to them.

In some implementations, the power converter 404 and the light sources 403 may be constructed as one single unit, for example on a common circuit board, in such a compact manner that it is not justified to present them as two separate structural blocks. In this kind of implementation, the illumination output 402 can be conceptually conceived as the current path(s) along which the illumination power passes to the light source(s), even if that current path is only an internal part of the compact unit described above.

The power converter 404 has a control connection 405 which may have one or more use applications. If the power converter 404 is controllable, it may be controlled by control signals delivered through the control connection 405. In this case the amount of illumination power generated by the power converter 404 is determined based on the control signals it receives through the control connection 405.

In FIG. 4, the control connection 405 is drawn as bidirectional for indicating that, in accordance with another purpose, the power converter 404 may output diagnostic signals, i.e. measurement and monitoring data, to the circuit which controls it, which signals describe operation of the power converter 404 and/or light sources 403. It is not relevant as such to the invention in which form the signals pass in the control connection 405. Some examples of preferred implementation ways of the control connection 405 are discussed below.

The control device of the vehicle luminaire shown in FIG. 4 has a control data connection 406 for transmitting control data. Control data may be referred to as any data passing through the control data connection 406 regardless of the direction in which it is moving and of its relevance and/or purpose. One possible use of the control device of FIG. 4 in vehicle lighting arrangement is one in which a separate central controller (not shown in FIG. 4) is arranged for controlling a plurality of luminaires included in same vehicle. Each of these luminaires has its own control device, such as the one shown in FIG. 4. The central controller delivers the control data to the control devices, for example, along the lighting control bus, whereby the control device of FIG. 4 would connect to said lighting control bus via its control data connection 406. The lighting control bus is often a wired bus to ensure the reliability of the data transfer, but the term "bus" should not be construed as limiting in this sense, instead the control data connection 406 may be arranged also to receive wirelessly transmitted control data.

The control device of FIG. 4 has a controller circuit 407 coupled between the control data connection 406 and the control connection 405, one function of which may be the control of for example a (controllable) power converter 404 based on control data, which has been received through the control data connection 406. In the vehicle lighting arrangement described above, the central controller may deliver control data along the lighting control bus for example as analog voltage levels or digital command words, whereby the function of the controller circuit 407 is to identify the control data assigned to it and to generate and output to the control connection 405 of the power converter 404 control signals which cause the power converter 404 to produce exactly the desired illumination power. For this purpose, the controller circuit 407 may include, for example, a microprocessor or a microcontroller programmed to perform the necessary operations. The power converter 404 may be implemented so as to operate in a specific way in exceptional circumstances: for example, in a situation where no control signals are received through the control connection 405, the power converter 404 may provide the required illumination power for emergency lighting.

In addition to simple power commands, the central controller may utilize the lighting control bus to transmit commands that make the luminaires of the vehicle create various other lighting effects. These may involve aspects related to changes in brightness, colour, colour temperature, intended physiological effect on humans, or the like.

In addition to or instead of the foregoing, the function of the controller circuit 407 may be to receive one or more diagnostic signals from the power converter 404 through the control connection 405. Diagnostic signals may also be generated internally within the controller circuit 407 itself. After receiving and/or generating the diagnostic signals, the controller circuit 407 is arranged to communicate the diagnostic information resulting from the diagnostic signals via the control data connection 406. Such diagnostic information is thus a subset of control data transmitted through the control data connection 406. Communicating the diagnostic information may be unidirectional, so that the controller circuit 407 transmits the diagnostic information via the control data connection 406. It may also be bidirectional, meaning that diagnostic information may be both transmitted and received through the control data connection.

Diagnostic signals may describe, for example, some values of important electrical quantities (currents, voltages, power, frequencies, etc.) or other values of measured quantities (temperature, acceleration, humidity, etc.). For example, the controller circuit 407 may perform preliminary analysis and delimitation so that it does not generate or transmit diagnostic information if the diagnostic signals received or internally generated by its power converter 404 indicate only normal operation. The diagnostic information to be transmitted would then only represent diagnostic signals classified as exceptional. In addition, or alternatively, the controller circuit 407 may generate diagnostic information in form of assemblies in which some larger amount of diagnostic signals received over a period of time, are compressed for example by averaging, by looking for extremes thereof, by calculating from it some other statistical indicator, or otherwise. One potential use of diagnostic information is condition-based maintenance, i.e. intelligent and selective targeting of service and maintenance operations on devices based on how the diagnostic information describes their condition and performance.

The control device has a control power input 408 separate from the operating power input 401 and coupled to the controller circuit 407, and through which the control device can receive control power to the controller circuit 407 independently of the operating power which the control device can simultaneously receive or not receive through the operating power input 401. Control power refers to the electrical power which is used to operate at least the controller circuit 407. The amount of control power is not significant per se, but when considering the power levels that can be used in the currently known vehicle lighting arrangements, the amount of control power received by the control power input 408 is advantageously no more than few hundred milliwatts.

Receiving control power independently of the operating power means that the control device may receive the control power irrespective of whether it also receives operating power or not. An alternative characterization is to say that the control device receives the control power separately from the operating power.

The control device has a galvanic isolation 409 between the controller circuit and the power converter 404. In other words, the connection from the controller circuit 407 to the control connection 405 passes through the galvanic isolation 409. In FIG. 4, the reference numeral 410 denotes the connection between the controller circuit 407 and the galvanic isolation 409, but the galvanic isolation 409 might also be considered as part of the controller circuit 407 (or part of the power converter 404).

There are many advantages to using galvanic isolation 409. Voltage levels in the power converter 404 and the controller circuit 407 may be independently selected, for example, according to which is best suited for distributing operating power to the equipment of the vehicle, and on the other hand, which is best suited for transmitting control data. Controller circuit 407 may also be kept active when the operating power distribution to the equipment of the vehicle (or at least its luminaires) has been temporarily suspended for example for safety and/or energy conservation reasons, or if the train car or the bus is stationary at depot and does not have such an efficient external power supply available to make it possible or reasonable to distribute operating power to the devices. Without the galvanic isolation 409, it would be possible that, in the absence of operating power, at least some of the control power intended for the controller circuit 407 would inadvertently leak to the power converter 404 side, which, in addition to wasting energy, could cause undesired glow from the LEDs, for example. Galvanic isolation 409 also improves electrical safety in that since the voltage and current levels processed in the controller circuit 407 and the control data connection 406 are typically very low, installation and maintenance work on them can be performed safely in all situations without fear that higher power and/or current levels would pose a hazard. Furthermore, when the galvanic isolation 409 has been implemented inside the control device, the control data connection 406 does not require separate galvanic isolation (which might otherwise be necessary for providing sufficient isolation between the distribution of operating power and the transmission of control data), but the control data connection 406 may be implemented with cheaper technology, e.g. as a RS-485 bus connection or by connecting the terminals of the bus wires directly to the corresponding connectors on the control device. Further, the galvanic isolation 409 and separate distribution networks for operating power and control power allow the control device to operate as part of vehicle's own data transfer network for which it is advantageous to be able to operate even when operating power is temporarily unavailable. Yet another advantage is that in case the control data bus, the control power bus, or the controller circuit fails, the power converter 404 is still able to supply power to the light source 403 and thereby to secure, for example, an emergency lighting condition.

Many of the advantages described above are fulfilled in particular when the control power input 408 is arranged to receive an extra low voltage as defined in electrical safety regulations. What is considered an extra low voltage depends on the applicable electrical safety regulations. For example, the SELV voltage levels (Separated Extra Low Voltage) are up to 120 volts DC or up to 50 volts AC, whereby the connection also does not require any grounding. In many vehicles that use batteries to supply and/or secure at least part of the electrical system, the general extra low voltage level is 12 volts DC. Lower voltages of the order of 5 volts are also commonly used in control bus type implementations.

The control device of FIG. 4 further shows a possible control power output 411 through which the device may optionally distribute control power outside to other devices. If such an output is present in the device, it is most preferably coupled to the same side of the galvanic isolation 409 as the control power input 408, i.e. it is also galvanically isolated from the part of the device where the operating power is processed. The control power output 411 may be used, for example, in embodiments where substantially continuous activity and data transfer capacity of the control device are utilized by connecting it with one or more external devices, such as measuring sensors. Examples of such embodiments are discussed in more detail below.

In FIG. 4, the control power input 408, the control power output 411, and the control data connection 406 are drawn physically separated from each other to illustrate the description. The connections may also in practice be physically separate. However, in their implementation, it is also possible to use at least partially the same physical connections, in which case these three concepts may be only logically separate. One example of such an implementation is where only one physical connection is arriving to the controller circuit from outside the control device, through which both control power and control data are transmitted. Another example is where the control power input and the control data input form one physical connection and the control power output and the control data output another. Yet another example is where one physical connection forms a control power input and a bidirectional control data connection, and there is separately a control power output. Also other examples are possible. In the field of wired data transmission, there are many known methods for combining power and data transmission in one physical connection, and it is not necessary to elaborate them in more detail herein.

FIG. 5 schematically illustrates an implementation of the control device for vehicle's luminaire, which follows the principle of FIG. 4. In the implementation of FIG. 5, the operating power input 401 is a bipolar input with poles designated as +U1 and −U1 (operating power voltage may be denoted by U1). The illumination output 402 is bipolar as well and has light sources 403, in this example six LEDs in series, connected to it. Between the operating power input 401 and the illumination output there is a power converter 404, which in this embodiment is a controllable power converter. The controller circuit 407 in the implementation of FIG. 5 is composed of three functional blocks, which are the controller circuit logic 501, the transceiver 502 and the control power block 503. From these, the actual intelligence of the controller circuit 407 is located in the controller circuit logic block 501. The transceiver 502 is a communication module in use thereof, and the control power block 503 performs functions pertaining to the internal distribution of control power within the control device, such as regulation, protections for failure situations, and so on.

The galvanic isolation 409 in the implementation of FIG. 5 is based on opto-isolators, with at least two opto-isolators coupled so that bidirectional data transmission over galvanic isolation 409 is possible. Opto-isolators may be used for analog or digital data transmission or a combination thereof. One exemplary possibility is to use an analog form in transmission of diagnostic signals from the power converter 404 to the controller circuit 407, in such a way that the output current measurement for example at the illumination output 402 causes in galvanic isolation 409 the opto-isolator's LED to burn more intensively the higher the output current. Another exemplary possibility is to use pulse width modulated control pulses for transmission of control signals from the controller circuit 407 to the power converter 404, whereby the current of the control pulses generated by the controller circuit 407 causes a switching pulse current directly using the corresponding pulse ratio in the power converter 404 for the switch transistor of the switched-mode power source. In addition to these examples, it will be apparent to a person skilled in the art that galvanically isolated data transmission between the power converter 404 and the controller circuit 407 may be accomplished in numerous other ways. In addition to or in place of opto-isolators, other galvanically isolating data transmission techniques may be used, such as capacitive or inductive data transmission, infrared data transmission, or short-range radio communication.

In the implementation of FIG. 5, the controller circuit 407 has connections to five lines in total, including a bipolar control power bus +U2/−U2, a bipolar data bus Data+/Data−, and a so-called grant line, or E-line. Compared to FIG. 4, the connection to the control power bus +U2/−U2 forms the control power input 408. The connection 504 to the data bus Data+/Data− and the connection 505 to the E-line would both be included in the control data connection 406 in the division shown in FIG. 4, although especially the coupling passing through the connection 505 to the Eout line (and also the connection 504 to the data bus Data+/Data−, when the transceiver 502 is adapted for performing bidirectional data communication) could also be referred to as control data outputs. A control data output can generally be referred to as any such connections through which the controller circuit 407 is arranged to send data to other devices. If the control device has a control data output, it may be included, as described above, in the control data connection, which is (at least in part) a bidirectional bus connection.

If the arrangement includes an E-line connected as shown in FIG. 5, it can be used, for example, for controlling events for which, for some reason or another, a control device specific addressing is not possible or desirable to use. As an example, one may consider a situation where a number of newly manufactured control devices according to FIG. 5 are installed as part of the lighting arrangement of a particular vehicle, but have not yet been given unique addresses. In other words, even if they could all exchange information with, for example, a central controller via the data bus Data+/Data−, the central controller cannot for the time being target any particular information to a particular control device.

For this situation, the controller circuit 407 may be programmed or otherwise arranged to operate so that it remains inactive until it receives, via the Ein line, a specific grant signal, e.g., a +5V potential relative to a reference level defined by the data bus. While being inactive, it keeps the Eout line in some state that clearly corresponds to the absence of grant signal, for example at 0V potential relative to the reference level defined by the data bus. Upon receiving the grant signal, the controller circuit 407 begins to communicate with the central controller connected to the data bus, obtains an address from it and stores it. The controller circuit 407 then retransmits the grant signal to the Eout line, through which it is received by the next corresponding control device connected to the same E line. By doing this, it is possible to ensure that the controllers request for themselves addresses from the central controller in order, after which any addressed communication on the data bus Data+/Data− is possible.

Instead of or in addition to a separate E-line, the corresponding functionality can be implemented, for example, by having separate control power input and control power output (as in FIG. 4) and suitable switching means between them. Receiving a grant signal through the Ein line may correspond to that the controller circuit is receiving control power through its control power input in the first place. The switching members are arranged to operate so that the controller circuit forwards the control power through its control power output only after requesting and receiving an address from the central controller via the data bus. Thus, in such an arrangement, the control power input and output are conceptually part of the control data connection.

The operation of the type presented in the foregoing examples can generally be described so that the controller circuit 407 is arranged to perform a predetermined operation related to processing of control data, only in response to a grant signal which it has received through the control data connection. In addition, the controller circuit 407 is arranged to forward the grant signal through the control data output (or more generally: the control data connection) after having performed said operation.

FIG. 6 schematically shows a lighting arrangement for a vehicle. The vehicle in this example is a train car, and the lighting arrangement is intended to illuminate its various compartments, such as cabin 601 and toilet 602. The cabin has both general luminaires 603, 604, 605 and 606 and spotlights 607 and 608 suitable for seat specific lighting. Each of the general luminaires 603, 604, 605 and 606 has one control device connected to a single LED module, the LEDs functioning as light sources. The spotlights 607 and 608 each have two light sources connected to a common control device with two illumination outputs. The control devices of the spotlights 607 and 608 also have connections for seat-specific light switches, exemplified by the light switch 609, which can be used by passengers to switch on and off the light source of the spotlight located at their seat. The light switches herein illustrate that in addition to the connections described above, the control device may also have other connections which have influence on its operation. The central controller 610 of the lighting arrangement and its battery backup 611 are located in the technical space 612 of the vehicle, which also houses the operating power supply unit 613.

FIG. 6 illustrates the principle according to which at least those parts of the vehicle's lighting arrangement which are galvanically isolated from the operating power distribution may be harnessed to perform other functions not just related to lighting. One such task is measurement and control, which are useful in monitoring the state of many environmental factors and other systems in the vehicle. For example, the control device 614 included in the luminaire 605 has a sensor 615 coupled to its controller circuit (not shown separately), which sensor is arranged to measure at least one prevailing environmental factor of the luminaire 605. The sensor 615 may, for example, be a temperature sensor, a gas sensor, a humidity sensor, an air pressure sensor, an acceleration sensor, a motion sensor, an occupancy sensor, or any combination thereof. As another example, the control device 617 of the toilet light 616 has a sensor interface for connecting an external sensor 618 to the controller circuit of the control device of the light 616. The external sensor 618 in this example is a level sensor that monitors the level in the toilet water tank. In this type of arrangement, the control device of the luminaire functions as a data communication conveyor capable of transmitting, receiving, and processing information related to both the luminaire itself and an external device, such as a sensor included in or connected to the control device. When compared to the division shown in FIG. 4, the sensor interface may include portions of the control data connection 406 and the control power output 411.

The control device may also have one or more sensors connected to the side of the galvanic isolation which has the power converter. If the signals generated by such sensors are to be forwarded via the controller circuit, the control device must have means for transmitting the sensor signals they produce over galvanic isolation to the controller circuit.

It has already been pointed out above that, as illustrated in FIG. 6, the vehicle's lighting arrangement may have a central lighting controller 610 and an associated vehicle lighting control bus 619 used to provide at least control data to the luminaires. At least one control device of the vehicle's luminaire is connected to the control bus 619, each via its own control data connection (see e.g. control devices 614 and 617 in FIG. 6). One or more light sources are connected to the illumination output of the control device(s). In addition, the arrangement may include an operating power bus 620 coupled to a further power distribution system of the vehicle (cf. operating power supply unit 613) to which said control devices of the luminaires are coupled via their operating power inputs. In addition, the arrangement may have a control power bus extending from the central lighting controller 610 to the control devices of the luminaires, to which the control devices of the luminaires are connected via their control power inputs. In FIG. 6, the control power bus is not shown separately but can be considered as extending along the same line as the control bus 619.

In this example, the central lighting controller 610 is battery-backed, i.e. it receives sufficient amount of operating power from the battery pack 611 even when the operating power supply unit 613 is shut off. The power available from the battery pack 611 may also be supplied along the control power bus to the control devices of the vehicle's luminaires, whereby they will remain operational as well, even if the actual distribution of vehicle's operating power was interrupted.

As yet another example of sensing and possible utilization of control bus 619 (and control power bus), FIG. 6 shows a sensor 621 which does not require the control device of the luminaire in order to connect to the control bus 619 (and control power bus), but which can directly connect thereto as an independent device. The lighting arrangement may thus be characterized by saying that it may include one or more sensors, each of which is coupled to the central lighting controller 610 either directly or via one of the lighting control devices included in the arrangement. The coupling to the central controller 610 may include supply of both the data communication and the required power. On the other hand, an embodiment is also possible in which at least one of said sensors is coupled to a central lighting controller 610 for supplying only an operating voltage (along the control power bus) to said sensor, wherein said sensor is also in wireless data communication with another measurement arrangement.

In addition to or instead of sensors, other types of devices can also be used, one example of which is a burglar alarm transmitter. The vehicle may be equipped with a burglar alarm that wirelessly alerts when its sensors detect inappropriate motion. Because the burglar alarm's own power consumption is typically relatively low, and since, on the other hand, the burglar alarm should remain functional even when the vehicle's operating power distribution is interrupted, it is advantageous to make it use at least control power distribution in the same manner as other devices described above.

The foregoing exemplary embodiments of the invention are not intended to be limiting, but are intended to exemplify some of the features of the invention in practice. The features disclosed in connection with a particular embodiment may be combined with the features presented in connection with another embodiment, unless otherwise specifically stated herein.

The invention claimed is:

1. Control device for a luminaire of a vehicle, the control device comprising:
an operating power input for receiving operating power;
an illumination output for directing illumination power to one or more light sources;
a power converter coupled between said operating power input and said illumination output for converting said received operating power into said illumination power, which illumination power is directed to said illumination output, the power converter comprising a control connection;
a control data connection for conveying control data;
a controller circuit coupled between said control data connection and the control connection;
a control power input coupled to said controller circuit, said control power input being separate from said operating power input, for receiving control power to said controller circuit independently of said operating power; and
a galvanic isolation between said controller circuit and said power converter, wherein the connection from the controller circuit to said control connection passes through said galvanic isolation.

2. The control device according to claim 1, wherein:
said power converter is a controllable power converter, wherein the amount of said illumination power it generates is determined based on the control signals it receives through said control connection; and
said controller circuit is arranged to generate said control signals based on control data received through said control data connection.

3. The control device according to claim 1, wherein:
said controller circuit is arranged to receive from said power converter one or more diagnostic signals through said control connection and to communicate diagnostic information resulting from the diagnostic signals it has received, via said control data connection.

4. The control device according to claim 1, wherein:
said controller circuit is internally arranged to generate one or more diagnostic signals and to communicate diagnostic information resulting from the diagnostic signals it has generated, via said control data connection.

5. The control device according to claim 1, wherein said control power input is arranged to receive an extra low voltage as defined in electrical safety regulations.

6. The control device according to claim 1, comprising a sensor coupled to said controller circuit, which sensor is arranged to measure at least one environmental factor at the location of the luminaire.

7. The control device according to claim 6, wherein said sensor comprises at least one of: a temperature sensor, a gas sensor, a humidity sensor, an air pressure sensor, an acceleration sensor, a motion sensor, an occupancy sensor.

8. The control device according to claim 1, comprising a sensor interface for connecting an external sensor to said controller circuit.

9. The control device according to claim 1, wherein said control data connection is a bidirectional bus connection.

10. The control device according to claim 1, wherein:
said controller circuit is arranged to perform a predetermined operation relating to processing of control data, only in response to a grant signal it has received through the control data connection;
said control device has a control data output connected to said controller circuit; and
said controller circuit is arranged to forward the grant signal through said control data output after having performed said operation.

11. A luminaire for a vehicle, comprising:
a control device that comprises an illumination output for directing illumination power to one or more light sources; and
connected to said illumination output, said one or more light sources which form a LED module;
wherein the control device additionally comprises:
an operating power input for receiving operating power;
a power converter coupled between said operating power input and said illumination output for converting said received operating power into said illumination power, which illumination power is directed to said illumination output, the power converter comprising a control connection;
a control data connection for conveying control data;
a controller circuit coupled between said control data connection and the control connection;
a control power input coupled to said controller circuit, said control power input being separate from said operating power input, for receiving control power to said controller circuit independently of said operating power; and
a galvanic isolation between said controller circuit and said power converter, wherein the connection from the controller circuit to said control connection passes through said galvanic isolation.

12. A lighting arrangement for a vehicle, the lighting arrangement comprising:
a central lighting controller;
a lighting control bus of the vehicle connected to said central lighting controller for supplying control data to luminaires of the vehicle;
at least one control device that comprises an illumination output for directing illumination power to one or more light sources; and
connected to said illumination output, one or more light sources which form a LED module;
wherein said at least one control device additionally comprises:
an operating power input for receiving operating power;
a power converter coupled between said operating power input and said illumination output for converting said received operating power into said illumination power, which illumination power is directed to said illumination output, the power converter comprising a control connection;
a control data connection to said lighting control bus for conveying control data;
a controller circuit coupled between said control data connection and the control connection;
a control power input coupled to said controller circuit, said control power input being separate from said operating power input, for receiving control power to said controller circuit independently of said operating power; and
a galvanic isolation between said controller circuit and said power converter, wherein the connection from the controller circuit to said control connection passes through said galvanic isolation.

13. The lighting arrangement for a vehicle according to claim 12, comprising:
an operating power bus for connecting to a further power distribution system of the vehicle; to which said at least one control device is connected via said operating power input; and
a control power bus extending from the central lighting controller to said at least one control device, to which control power bus said at least one control device is connected via said control power input.

14. The lighting arrangement for a vehicle according to claim 12, comprising one or more sensors, each of said one or more sensors being coupled to said central lighting controller either directly or via said at least one control device.

15. The lighting arrangement for a vehicle according to claim 14, wherein at least one of said sensors is coupled to said central lighting controller for supplying only operating voltage to said sensor, wherein said at least one of said sensors is further in wireless data communication with a measuring arrangement.

* * * * *